United States Patent [19]

Hsu

[11] Patent Number: 5,584,023
[45] Date of Patent: Dec. 10, 1996

[54] COMPUTER SYSTEM INCLUDING A TRANSPARENT AND SECURE FILE TRANSFORM MECHANISM

[76] Inventor: Mike S. C. Hsu, 1518 Ambergrove Dr., San Jose, Calif. 95131

[21] Appl. No.: 175,192

[22] Filed: Dec. 27, 1993

[51] Int. Cl.[6] ............................... H04L 9/32; G06F 9/44; G06F 12/14; H03M 7/30
[52] U.S. Cl. .................. 395/620; 395/670; 395/701; 395/888; 395/491; 380/4; 380/25
[58] Field of Search .................................. 395/425, 600, 395/650, 725, 700, 404, 405, 406, 412, 413, 419, 438, 439, 490, 888, 479, 491; 380/4, 3, 23, 25

[56] References Cited

U.S. PATENT DOCUMENTS

| | | | |
|---|---|---|---|
| 4,588,991 | 5/1986 | Atalla | 380/4 |
| 4,780,905 | 10/1988 | Cruts et al. | 380/44 |
| 5,007,082 | 4/1991 | Cummins | 380/4 |
| 5,052,040 | 9/1991 | Preston et al. | 380/4 |
| 5,113,442 | 5/1992 | Moir | 380/4 |
| 5,175,852 | 12/1992 | Johnson et al. | 395/600 |
| 5,463,772 | 10/1995 | Thompson et al. | 395/600 |

OTHER PUBLICATIONS

SCO® UNIX® System V1386 Development System, Device Driver Writer's Guide, Santa Cruz Operation, Inc., Santa Cruz, Calif., pp. 1—1 to 4–39 (no date listed).
Bach, "The Design of the UNIX® Operating System," Prentice–Hall, Inc. (England Cliffs, NJ), 1986.

*Primary Examiner*—Glenn Gossage
*Attorney, Agent, or Firm*—Fliesler, Dubb, Meyer & Lovejoy

[57] ABSTRACT

A computer system including a file transform mechanism, such as encryption, compression, encoding, translation and conversion, a file storage subsystem for storing a file composed of one or more blocks of data, a data storage subsystem for storing blocks of data in first and second logical data areas and a processor for executing instructions implementing a computer operating system in the first logical data area and an application program in the second logical data area. The processor is coupled to the file storage subsystem and the data storage subsystem for transferring a predetermined block of data between the file storage subsystem and the data storage subsystem. The processor includes (1) a transform mechanism, defined within the operating system, for transforming the predetermined block of data in the first logical data area separately from any other block of data; (2) a request mechanism, defined by the application program, for selecting the predetermined block of data to be operated on; and (3) an interface that controls the transfer of the predetermined block of data between the file storage subsystem and the data storage subsystem and between the first and second logical data areas. The interface can determine whether the predetermined block of data is transformed. The interface controls the transfer of the predetermined block of data from the file storage subsystem to the data storage subsystem and between the first and second logical data areas, transforming the data as required.

16 Claims, 5 Drawing Sheets

Microfiche Appendix Included
(36 Microfiche, 1 Pages)

COMPUTER SYSTEM INCLUDING A TRANSPARENT AND SECURE FILE TRANSFORM MECHANISM

Appendix I found on pages 43 through 76 of the specification as originally filed is now filed microfiche appendix consisting of one microfiche with 36 frames.

BACKGROUND OF THE INVENTION

1. Field of the Invention

The present invention is generally related to computer based file service extension systems and, in particular, to an extension system for at least multi-tasking computer systems where a secure, block oriented file service mechanism is employed transparently within the function of the operating system.

2. Description of the Related Art

As communal access to and use of computer systems increases, there is an increased demand for control over access rights to and transformation of computer data on an individualized basis. Computer systems are continuing to evolve toward and in the nature of multi-user systems, both directly and indirectly through a heterogeneous architecture of single-user, single-user multi-tasking and multi-user inter-networked systems possessing a remote file sharing capability. Thus, there is increased access capability to computer data maintained in a common logical file system. Furthermore, the file state and transformation requirements of varying data formats increases with the potentially greater number of users and application programs that may access the computer data files.

Conventional operating system based file access and protection mechanisms typically depend on file attribute and access list controls. These mechanisms are, however, inadequate to provide a sufficient level and transparency of security and control. In brief, attribute based controls are typically used to define read, write and execute permissions exercisable by the user, or file owner, a user group, or other, meaning all. Access list controls rely on the existence and maintenance of a predefined list of users that have been granted access rights to a file. Unfortunately, at least the system administrator, or super user, and the access list administrator are not preclusively bound by these permission restrictions. Therefore, access to the data content of a file is not secure against the super user or others who may inappropriately have or gain super user status. An error in the use or function of an application program that modifies the file attributes or control list also results in a security failure.

Conventional file protection mechanisms, incorporated within broader functioning application programs, generally provide for the encryption of the entire data file. These dedicated protection mechanisms are completely independent of file attribute and access list controls. There are, however, a number of drawbacks to the use of such application based protection mechanisms. Each such application program must entirely implement a proprietary protection methodology, such as encryption to ensure the security of the data files specifically associated with the program. Consequently, there is a nearly universal data incompatibility between such programs thereby precluding use or even simple access to common data by different applications.

Use of a dedicated encryption program otherwise independent of any suite of broad function application programs, i.e., an encryption utility program, solves the data file incompatibility problem. However, such encryption programs must generally be executed separately from and prior to the execution of other application programs. Execution also typically results in the restoration of a complete unencrypted data file within the logical file system. Aside from the practical difficulties of dealing with encrypted and decrypted versions of the same data file presumably closely co-resident within the logical file system, the unencrypted data file is no more secure than potentially obtained by conventional reliance on the file attribute and access control mechanisms previously described. Typically, the management of file attribute and access controls is sufficiently tedious, particularly when considered in combination with the separate need to execute and manage the encryption/decryption steps separate from the execution of other application programs, that these additional controls are not implemented. Consequently, the decrypted data file obtained by use of an encryption utility program represents a potentially greater security exposure.

Automatic or transparent file security systems have been proposed, such as the one disclosed in U.S. Pat. No. 5,007,082, issued to Cummins, on Apr. 9, 1991. There, an encryption mechanism is implemented through the addition of a hardware specific software based control routine at the basic input/output (I/O) system (BIOS) level of an operating system. This routine provides for the simple selective re-vectoring of the lowest level file transfer BIOS functions, specifically the floppy diskette access operations, through a file encryption routine. The entire file is automatically encrypted or decrypted when written or read from the diskette. In addition, a global "decryption flag," is stored uniquely in the computer memory and not with the diskette files. This flag is utilized to specify whether a specific diskette is to be treated as an encrypted or ordinary data file store quite independent of the specific files stored on the diskette. Where data is to be transferred to or from an encrypted diskette store, the data is encrypted within the memory of the computer system at the lowest level of the operating system and then only for the duration of the actual data transfer. Cummins specifically teaches that all in-memory data buffers need to store the data file in an unencrypted state in order to ensure operational compatibility with all potentially executing application programs.

A number of obvious vulnerabilities to the secure function of the Cummins mechanism exist. The revectoring approach is vulnerable to simple restoration of the original vectors, thereby bypassing the encryption control routine. Unencrypted diskette data files can then be freely prepared.

The use of a global flag signifying continuing use of the encryption control routine also provides a single, simple point for disabling the function of the encryption routine. Reliance on this flag is not specific to any specific user or file but rather to an entire computer system. Once modified, the security of the entire system is breached irrespective of any specific user or file.

Further, the maintenance of all data buffers within the computer system in an unencrypted state, except briefly in performing a physical data transfer, results in the computer memory image being inherently insecure.

Finally, the Cummins system is described solely with respect to diskette based data file protection. The data protection mechanism provides protection for data files only if removed from a computer system on transportable media. The disclosed mechanism is therefore clearly not applicable to freely internetworked systems, but rather only for physically separate, and physically secured single user systems.

Conventionally, file state and transformation requirements for data files are preserved as an integral part of the data files. As such, the relevant state defining information is largely usable only by the application that created the data file. Other applications must be specifically compatible with another application's file format or provide, typically through execution of a separate program, a conversion between file formats. All of the disadvantages discussed above, related to encryption and multiple instances of a given file, attach here as well.

SUMMARY OF THE INVENTION

Accordingly, a general purpose of the present invention is therefore to provide a file extension system, such as a secure file encryption system, transparently within an environment of multi-user and inter-networked computer operating systems.

This is achieved in the present invention by a computer system including a file extension mechanism, a file storage subsystem for storing a file composed of one or more blocks of data, a data storage subsystem for storing blocks of data in first and second logical data areas and a processor for executing instructions implementing a computer operating system in the first logical data area and an application program in the second logical data area. The processor is coupled to the file storage subsystem and the data storage subsystem for transferring a predetermined block of data between the file storage subsystem and the data storage subsystem. The processor includes (1) a file extension mechanism, defined within the operating system, for transforming the predetermined block of data in the first logical data area separately from any other block of data; (2) a request mechanism defined by the application program, for selecting the predetermined block of data to be operated on; and (3) an interface that controls the transfer of the predetermined block of data between the file storage subsystem and the data storage subsystem and between the first and second logical data areas. The interface can determine whether the predetermined block of data is transformed. The interface controls the transfer of the predetermined block of data from the file storage subsystem to the data storage subsystem and between the first and second logical data areas, transforming the data as required.

Thus, an advantage of the present invention is that a file extension mechanism, providing a secure file encryption mechanism, for example, is established within the function of a computer operating system.

Another advantage of the present invention is that the function of the file extension mechanism can be securely and transparently embedded in the operating system and specifically at the highest control level while maintaining full compatibility with conventional multi-tasking and/or multi-user operating system process inheritance mechanisms.

A further advantage of the present invention is that the file extension mechanism, in implementing the encryption algorithm is fast, provides an inherently substantial degree of file security, is easily maintained by authorized users for their encrypted files, imposes little additional processing overhead for accessing both encrypted and unencrypted files, and may be flexibly tailored to selectively permit additional ordinary users access to the encrypted files of another.

Yet another advantage of the present invention is that the file extension mechanism operates in implementing transformation operations on block level portions of a file, thereby inherently limiting the existence of untransformed portions of a file within the computer system to the minimum portion of the file required by a user application.

Still another advantage of the present invention is that, while block portions of a transformed file may be temporarily maintained in an operating system buffer pool for operating system and hardware efficiency reasons, such blocks are preserved there in a transformed state, thereby globally precluding a security exposure due to snooping of a memory image for untransformed blocks.

A still further advantage of the present invention is that file system maintenance where both transformed and untransformed files exist is essentially unaltered. A transparent method of identifying transformed files fully consistent with existing conventional multi-tasking and multi-user file privilege attribute mechanisms is used.

Yet still another advantage of the present invention is that the transformation operation is generally consistent with conventional file security and operating system implementation paradigms, thereby being generally portable to a wide variety of multi-tasking and multi-user computer operating systems.

A yet still further advantage of the present invention is that the file extension mechanisms implementing encryption, provides a secure cost-effective file protection mechanism that is specifically independent of any particular computer system hardware.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein.

DETAILED DESCRIPTION OF THE INVENTION

The present invention provides for a system of file transformations particularly suited for use in advanced computer operating systems. While the preferred embodiment of the present invention, and the following description thereof, are specific in detail to an encryption transform performed using the Unix® (trademark owner not known) operating system, persons of average or ordinary skill in the art will readily appreciate the ready extension of the principles of the present invention to other transforms, including code set conversion, compression, and translation, as well as encryption, and to other operating systems, including Windows-3.1 and Windows-NT by Microsoft, Inc., Redmond, Wash., System 7 by Apple Computer, Inc., Cupertino, Calif. VMS by Digital Equipment Corporation, San Jose, Calif. OS/2 by International Business Machines, Inc., Armonk, N.Y., and the many specific variants of the Unix Operating System such as provided by the Santa Cruz Operation, Inc. Santa Cruz, Calif. (SCO Unix), International Business Machines, Inc. Armonk, N.Y. (AIX), and Novell, Inc. Provo, Utah (UnixWare).

Accordingly, the detailed description of the preferred embodiments provided here is not to be taken as limiting the applicability of the present invention to any specific transform, operating system or computer system architecture, but rather the present invention is intended to be applicable to all transform and operating systems, as executed on corresponding computer systems, within the scope of the appended claims.

The Unix operating system is widely known and understood in terms of the operating principles and related control structures of the operating system. An excellent treatment of these concepts is provided in "The Design of Unix Operating System," by Maurice J. Bach, Prentice-Hall, Inc., 1986, and is expressly incorporated herein by reference. A significant design feature of the Unix operating systems is the ability to extend the operating system to accommodate selected sets of new and existing peripheral devices through the addition of corresponding kernel resident device drivers. A standard device driver interface generally as supported by the Unix operating system is described in "Device Driver Writer's Guide," available from the Santa Cruz Operation, Inc., 400 Encinal Street, Santa Cruz, Calif. 95061, and is also expressly incorporated herein by reference.

Figure 1:
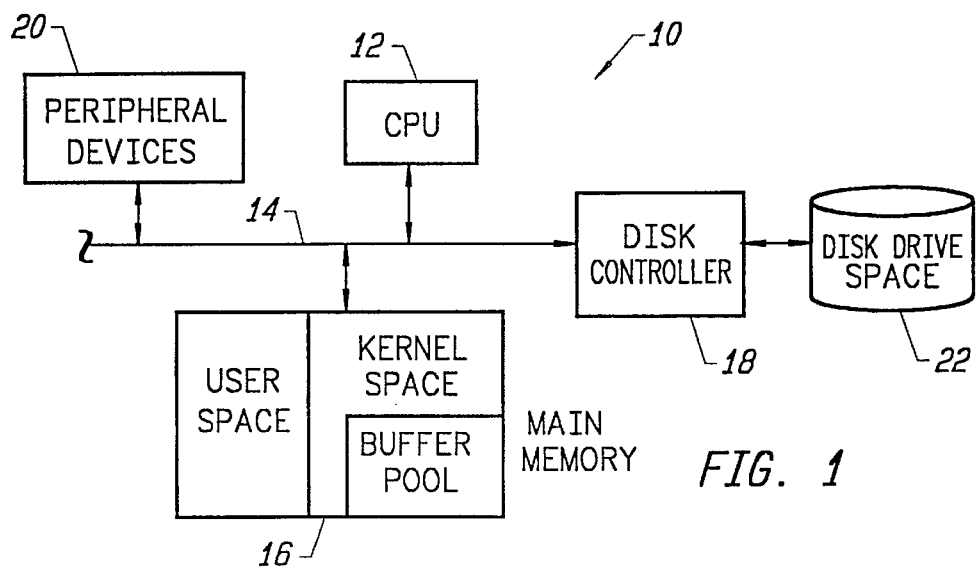
FIG. 1 is a representative drawing of a computer system according to the present invention.

Referring now to FIG. 1, there is shown a computer system 10 suitable for implementation of the present invention through the execution of an operating system and application programs. In the preferred embodiments of the present invention, the operating system is an implementation of the Unix operating system. A central processing unit ("CPU") 12 executes the operating system and any number of application programs. The CPU 12 is connected via a bus 14 to a main memory unit 16, a disk controller unit 18, and other peripheral devices generally indicated by the reference numeral 20.

The main memory 16 provides an addressable memory space to the CPU 12 for the storage of application programs and data and of the operating system and related data. As generally depicted in FIG. 1, the main memory 16 is logically managed as a combination of user space and kernel space. When the CPU 12 is executing program code in user space, the process within which such execution is occurring then exists in user mode. Where the process is executing in kernel space, then execution is in kernel mode.

Within the kernel space, a buffer pool, or buffer cache, is maintained by the operating system. This buffer pool represents a temporary buffer cache for data transferred via the disk controller 18 from a secondary memory such as a disk drive 22.

Figure 2:
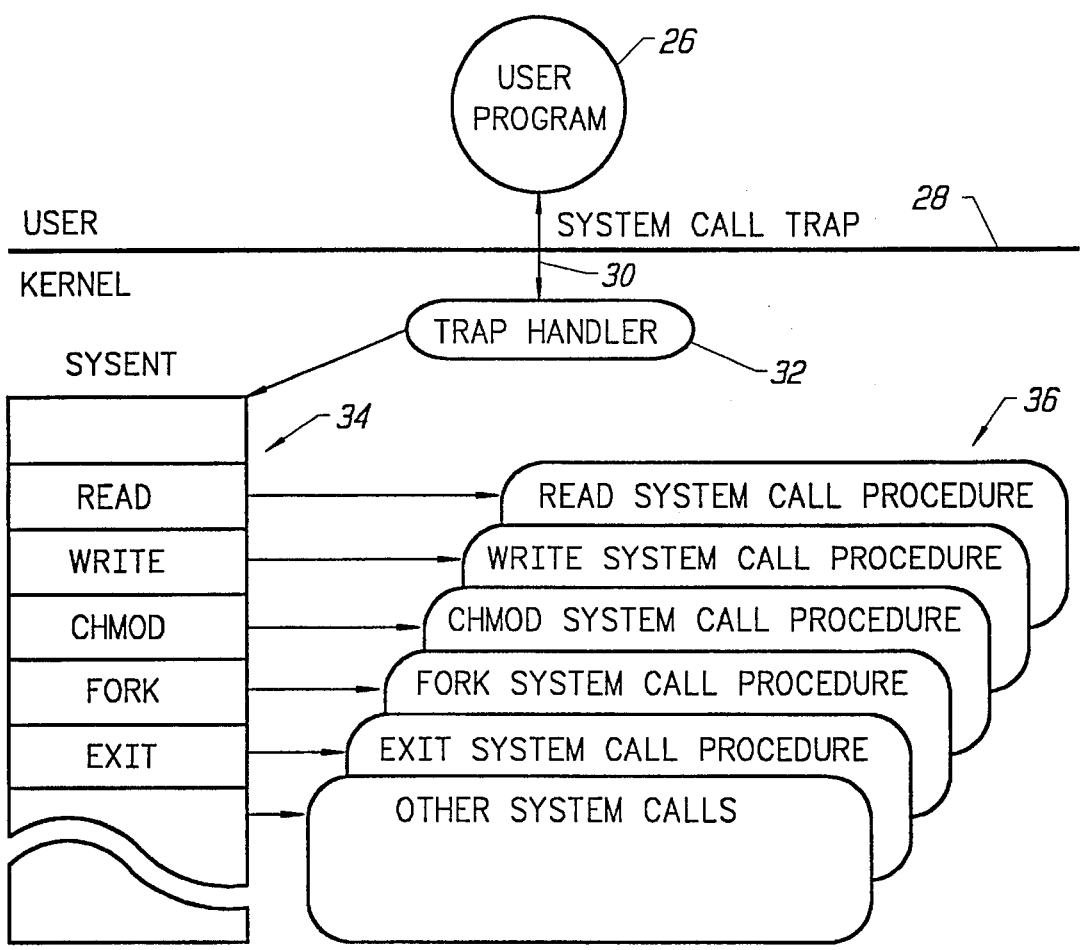
FIG. 2 is a schematic diagram of the logical data space and control structures utilized in a preferred implementation of the present invention.

Referring now to FIG. 2, a schematic diagram of the logical user and kernel mode spaces is shown. The application program 26 executes in user mode. Operating system calls 30 are issued by the application program to gain access to operating system resources. These calls are directed through a system call interface substantially existing within the kernel data space, though presenting an application program interface (API) accessible from user space. Typically this interface is implemented through a system call trap mechanism 32 that permits the user mode system call to initiate a mode switch to a kernel mode of operation within the same processes context. This mode switch may be delayed subject to the operation of the process scheduler of the operating system. When the mode switch completes, the process, now in kernel mode, is processed through the trap handler routine 32 that may be part of the system call interface. As a consequence, a call is placed against a system entry, or sysent, table 34. The structure of the system entry table is provided in Table I.

TABLE I

Structure of the System-Entry Table
From <sys/systm.h>

```
extern struct sysent {
    char sy_narg;           /* total number of arguments */
    char sy_setjmp;         /* 1 if systrap( ) should
                               not setjmp( ) */
    int (*sy_call) ( ) ;    /* handler */
} syset [ ];
extern int nsysent;         /* number of valid entries
                               in sysent */
```

The sysent table 34 functions as a dispatch table with each entry in the table corresponding to a different function supported by the operating system. Of particular relevance to the encryption transform embodiment of the present invention, the sysent table 34 includes entries for the open, create, read, write, chmod, fork, statf, seek, exit and ioctl system call procedures generally represented as procedures 36. As is evident from each entry in the sysent table, the system call address of each of the system call procedures is maintained in a respective entry ((*sy_call)()) within the sysent table 34.

The Unix operating system utilizes a file oriented paradigm in providing operating system services. Consequently, the open, create, read, write, seek, stat and close system call procedures permit logical operation relative to a wide variety of logical data entities, including directories, files, and pipes, for example, that are treated as files referenceable via directories. In turn, directories are maintained on disk as standard files containing specifically structured data. This directory file data includes a pointer to a disk based structure of disk inode entries. Each inode entry stores specifically relevant information describing, among other things, the protection mode, owner, user group and size of a particular data file. A summary of an inode entry, as stored on disk, is provided in Table II.

TABLE II

Structure of a Disk Inode
From <sys/ino.h>

```
struct dinode
{
    ushort    di_mode;     /* protection mode, file type */
    short     di_nlink;    /* number links to file */
    ushort    di_uid;      /* owner's user id */
```

TABLE II-continued

Structure of a Disk Inode
From <sys/ino.h>

|  |  |  |
|---|---|---|
| ushort | di__gid; | /* owner's group id */ |
| off__t | di__size; | /* number bytes in file */ |
| . . . |  |  |
| }; |  |  |

The open and create system call procedures cause the creation of "in-core" inodes in an inode table for each file opened or created. The in-core inode of a file contains much of information held in the disk inode structure. The statf system call procedure can be used to return a structure containing the disk inode mode information.

The chmod system call procedure is provided specifically to change the protection mode of disk files. The inode structure maintains a binary coded entry (di__mode) defining the file type and protection mode of the disk file. The three least significant octal digits of the mode specify the existent read, write, and execute permissions of the file for the file owner (0x00), the owner's group (00x0), and other (000x), where x represents any octal digit. Another octal digit of the mode entry (x000) is utilized to store additional permissions related information. The remaining bits of the mode are used to define the file type or are reserved. The chmod system call procedure takes, as an argument, a binary representation of the file protection mode (xxxx) and appropriately modifies the mode value stored by the disk inode corresponding to the referenced file.

In accordance with the present invention, a transformed file is identified by the presence of an enode data structure appended to a corresponding regular file. As will be discussed in greater detail below, this trailing enode structure includes data defining the transform applied to the file.

A specific pre-existing file mode may also be used to indicate the transformed state of a corresponding regular file. In an alternate embodiment of the present invention the selected mode is octal xx0x, where x is any octal digit. This represents an otherwise unlikely file mode since the group permission is defined as without conventional read, write or execute access to the file. Any other mode bit or bit pattern could be used where the same can be seen to have no other significant use. Any logically permitted mode bit or pattern can be used to define, for example, the encryption state of the corresponding regular file consistent with the present invention. Consequently, incompatibilities that might arise either from a redefinition of the mode bits with existing programs that rely on the existing exclusive definition of the mode bits is avoided. Further, as a logically permitted mode, the existing chmod utility program will readily accept and apply the mode value to the corresponding file inode.

The seek system call procedure is provided to position the file access pointer within, typically, a file. Subsequent read and write file accesses are performed relative to this pointer. The create and open system call procedures initialize the file access pointer to zero.

The fork system call procedure is utilized to create a new process within the control of the operating system. This child process is a logical copy of the parent process. All processes are managed by the operating system through the use of a process table within the kernel space of the operating system. A summary of a process table entry, stored as an element of a process table linked list, is provided in Table III.

TABLE III

Structure of the Process Table
From <sys/proc.h>

| typedef struct proc { |  |  |
|---|---|---|
| char | p__stat; | /* status of process */ |
| . . . |  |  |
| ushort | p__uid; | /* real user id */ |
| ushort | p__suid; | /* saved uid from exec */ |
| int | p__sid; | /* POSIX session id num */ |
| short | p__pgrp; | /* proc grp leader name */ |
| short | p__pid; | /* unique process id*/ |
| short | p__ppid; | /* process id of parent*/ |
| ushort | p__sgid; | /* saved gid from exec */ |
| sigset__t | p__sig; | /* signals pending */ |
| struct proc | *p__flink; | /* forward link */ |
| struct proc | *p__blink; | /* backward link */ |
| . . . |  |  |
| struct proc | *p__parent; | /* ptr to parent proc */ |
| struct proc | *p__child; | /* ptr 1st child proc */ |
| struct proc | *p__sibling; | /* next sibling proc */ |
| . . . |  |  |
| } proc__t; |  |  |

Thus, each entry in the process table represents a structure containing information defining the relevant attributes of the process. Each process has a unique process ID (p__pid) and is managed via a separate physical entry within the procedure table. Each entry in the procedure table also includes linking information identifying the parent process (p__ppid), if any, of the current process. In completion of a fork system call procedure, the parent process is also provided with, as a return value, the process ID of the newly created or spawned child process. Thus, both the resulting parent and child processes may uniquely identify themselves and their related process. Multi-tasking operating systems, in general, implement multiple procedures as a way of managing the multiple tasks. The newer and more sophisticated operating systems often also implement mechanisms known as threads and lightweight processes as a convenient manner of augmenting the functionality of multiple processes, though without the additional complexity and overhead of full process context management. However, relevant to the present invention, threads and lightweight processes may be treated equivalently to the creation of processes via the fork system call procedure.

The exit system call procedure is provided to permit an application program, or the operating system itself, to terminate a process. Termination of a process results in closing of all of the file descriptors associated with the process, including release of the related in-core inodes, and the removal of the corresponding entry from the process table. In closing any existing file descriptors, any corresponding data is first flushed from the kernel buffers associated with the process to the buffer pool and subsequently to disk as appropriate. The disk inode is then also updated.

Finally, the ioctl system call procedure is provided for peripheral device specific operation control. In order to accommodate the variety of specific hardware, representing peripheral devices, that can be attached to a computer system 10, the Unix operating system permits device driver control modules to be integrated with the operating system kernel. Typically, each peripheral device is required to have a supporting device driver within the kernel to accommodate the specifics of the hardware implementing the peripheral device. Device drivers will include character device and buffered block mode device system call procedures. Character oriented devices will be typically supported with open, read, write, close and ioctl system call procedures. Where a peripheral device is susceptible to operating with block oriented system call procedures, the device driver will support open, close and strategy system call procedures. The strategy system call procedure is a common entry point for low-level data transfers via the buffer pool as a consequence of read and write buffer system calls subject to the file caching algorithm implemented by the operating system.

In order to support the file oriented paradigm of the Unix operating system, a device driver is logically represented within the file system of the operating system by device files. These device files provide defining information specifying that the inode corresponds to either a character or block oriented device of a device driver and, further, the major and minor numbers utilized to identify the specific device driver (major number), and a particular variant of the device driver system call procedures (minor number) used to accommodate minor variations in the hardware or operation of the peripheral device. As with all files, file access permissions are also maintained in the device files, thereby permitting access restrictions to be enforced.

Figure 3:
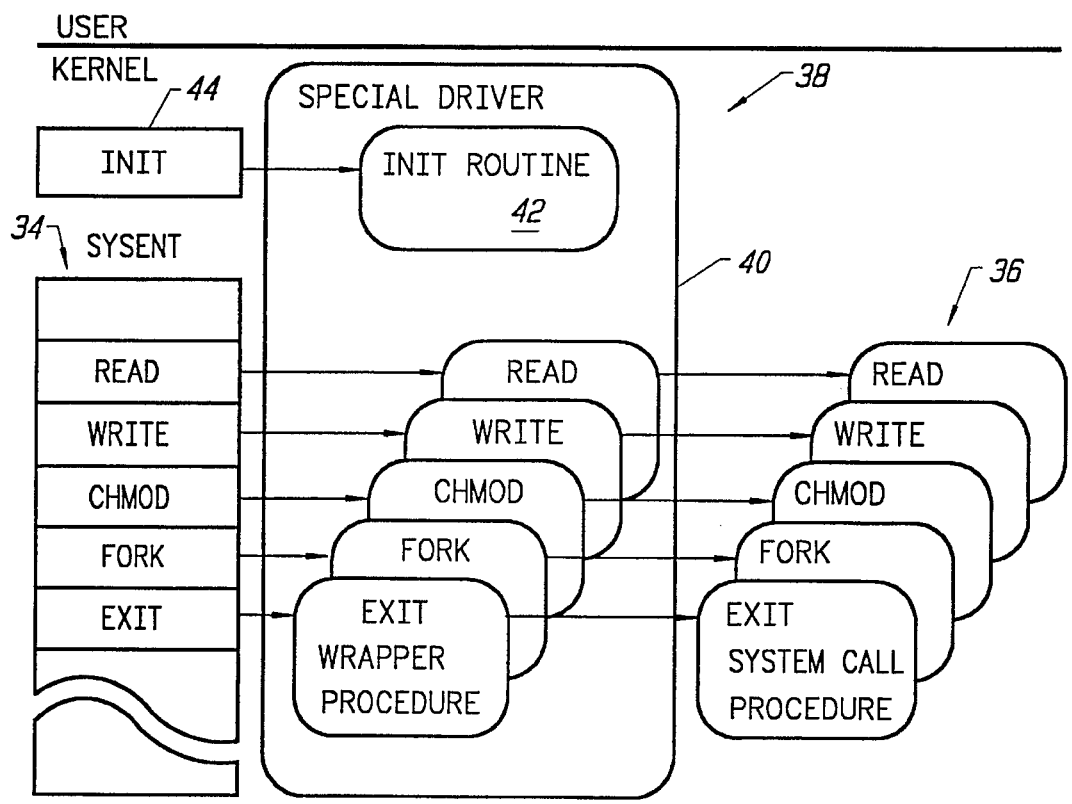
FIG. 3 is a schematic diagram representing the interception of select system calls in accordance with a preferred embodiment of the present invention.

In accordance with the preferred embodiment of the present invention, providing for the encryption of data files, a device driver is provided within the kernel of the operating system to support the selective encryption of disk based data files. As shown in FIG. 3, the device driver 38 of the present invention is not specifically related to any particular peripheral device 20. Rather, the capability of including a device driver in the kernel of the operating system is utilized advantageously to permit system call wrapper procedures 40 to be installed functionally between the sysent table 24 of the system call interface and corresponding selected system call procedures 36. This allows the existent system call procedures 36 of the operating system to be transparently modified by encapsulating each of the system call procedures 36 as atomic operations within the corresponding system call wrapper procedures 40.

Also included in the device driver 38 of the present invention is an initialization routine 42 that installs the system call wrapper procedures 40 in the functional call path between the sysent system call entries 34 and the corresponding system call procedures 36. During the initialization of the operating system as a whole, a standard initialization call 44 is made by the operating system kernel to each device driver present within the kernel. When the initialization routine 42 of the device driver 38 of the present invention is called, the installation routine 42 scans the sysent table 34 and determines whether the table contains proper entries for each of the system call procedures required by the device driver. Where all of these system call procedures validly exist, the initialization routine 42 substitutes the addresses of the system call wrapper procedures 40 into the corresponding locations within the sysent table 34. The addresses of the original system call procedures are retained for subsequent reference by the device driver 38. Any subsequent system call will be effectively intercepted by the device driver of the present invention.

An alpha table is also allocated during the initialization of the device driver. This table is formed as an array of pointers, preferably three pointers per table slot, to alpha table structures. Each table slot is defined, in accordance with the present invention, to uniquely correspond to a slot in the process table of the operating system. All alpha table pointers are initialized to zero.

An enode table is then allocated. This table is formed as a pointer array with each pointer pointed to a structure including an "in use" entry and an enode structure. Each table slot is defined, in accordance with the present invention, to uniquely correspond to a slot in the "in core" inode table of the operating system. All enode table pointers are initialized to zero.

A device driver flag is then appropriately set to indicate whether the initialization routine completed correctly and that subsequent operation of the device driver in accordance with the present invention is possible.

The ioctl system call specific to the device driver of the present invention is issued by a simple application program also specific to the present invention. The application program provides a simple user interface to obtain a password key for validating the encryption and decryption of data files protected by the present invention. This get_key application program obtains a user entered password key, opens the character device file of the device driver of the present invention, and then issues a SETKEY ioctl command with the user entered password key as an argument. The ioctl system call procedure of the device driver of the present invention preferably provides for the generation of an alpha table structure and for storing a pointer to that structure in the alpha table. The pointer storage location is chosen as one of the pointer locations within the alpha table slot that logically corresponds to the process table slot of the process that executed the get_key application. The slot relationship between the alpha table and process table is such that neither directly references or is referenced by the other. That is, in accordance with the present invention, the control table, alpha, is not linked by pointers in any traceable way from the process table or any other conventional control structure within the kernel of the operating system.

Consequently, a substantial degree of security is inherently obtained by the absence of any traceable connection between the process table and the alpha table of the present invention. Further, by establishing the alpha table as a structure defined only within the device driver of the present invention, there are no external symbol references to the location of the alpha table. A further degree of security may be obtained by dynamically allocating the table and table entries upon initialization of the device driver. Consequently, each instantiation of the table as well as the table entries will likely be at different locations within the data space of the kernel.

Table IV provides a description of the preferred definition of the alpha table (alpha_t) and of each alpha structure (alpha).

TABLE IV

Structure of an Alpha Table Entry
From "alpha.h"

| | | |
|---|---|---|
| struct alpha_t { | | /* the alpha table*/ |
|    struct alpha | *primary_key; | |
|    struct alpha | *alternate_key; | |
|    struct alpha | *working_key; | |
| }; | | |
| struct alpha { | | /* the alpha structure */ |
|    unsigned char | encryptab[256]; | /* encrypt. tab */ |
|    unsigned char | decryptab[256]; | /* decrypt. tab */ |
|    int | refcnt; | /* reference cnt */ |
|    struct key | cyptkey; | /* encrypt. password */ |
| }; | | |
| struct key { | | |
|    unsigned char | str[12]; | /* password key */ |
| }; | | |

The alpha table is an array of pointers to alpha structures. The length of the alpha table, and therefore the number of available alpha slots, is equal to the defined number of process table slots or entries (typically nproc). In many multi-tasking operating systems, the procedure or process table has a predefined static size. However, should the process table permit dynamic allocation of process table entries upon initiation of the operating system, then the device driver of the present invention may scan the process table or otherwise determine the number of process table entries in order to permit dynamic allocation of a corresponding number of alpha table slots. In either case, an equal number of available slots are preferably maintained in both the alpha table and the process table. Consequently, entries in the alpha table may be logically correlated to entries within the process table by reference to slot index offsets and without any direct linking between the two structures. That is, the table index of a slot in the process table will have a corresponding slot in the alpha table at the same index offset. Furthermore, by establishing the alpha table as an array of pointers to structures constituting the structures for each index slot location of the alpha table, an alpha structure may be multiply referenced from the alpha table. This capability permits multiple processes to logically share common encryption access permissions. As will be seen subsequently, this capability facilitates inheritance of the encryption access permissions.

Figure 4A:
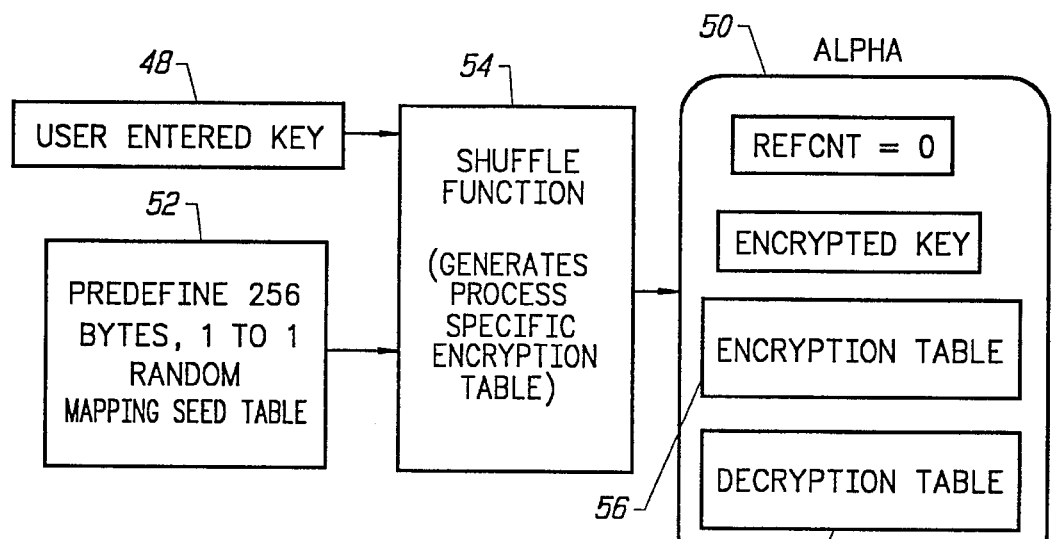
FIG. 4a is a representative depiction of the generation of an encryption control table entry.

Referring now to FIG. 4a, shows a representative depiction of the generation of an encryption control table entry. In response to the SETKEY ioctl system call, the ioctl system call procedure of the preferred device driver of the present invention obtains the entered password key 48 from the user mode space. Assuming that this reference is the first reference to an alpha table slot in response to the SETKEY ioctl system call, an alpha structure will be assigned to the primary key entry of the slot. The alpha structure will also be duplicatively assigned to the working key entry by virtue of being the last alpha structure used relative to this slot. Assuming further that no other process has initialized an alpha structure with the same password obtained by the get_key application for the present process, an alpha structure 50 is permanently allocated within the kernel data space. The alpha structure 50 is initialized and a pointer assigned to the alpha primary key entry of the current alpha table slot. The reference count (refcnt) of the alpha structure 50 is set to one.

The user provided password key is used in conjunction with a predefined seed table to create, by index value substitution, an encryption table 56 that is stored in the alpha structure 50. The seed table, preferably included as a predefined element of the device driver of the present invention, preferably consists of 256 randomly ordered unique byte values. In the preferred embodiment of the present invention a shuffle function 54 is implemented to generate the process specific encryption table 56. The preferred shuffle function provides for a modulo four progressive recalculation of values based on the byte values of the password key and the seed table.

TABLE V

Pseudo Code of the Preferred Shuffle Function

```
shuffle(key[12],buf[256]) {
        int       x, y,    idx, encrypted_x;
        extern              seed_table[256];
        for x = 0 to 255; do
            y = x;
            for idx = each position in the key string; do
                switch(idx % 4) {
                    case 0: y = y + key[Idx]; break;
```

TABLE V-continued

Pseudo Code of the Preferred Shuffle Function

```
                    case 1: y = y * key[idx]; break;
                    case 2: y = y / key[idx]; break;
                    case 3: y = y - key[idx]; break;
                }
            done
        loop
            loop
                y = y modula 256;
                encrypted_x = seed_table[y];
                y = y + i;
            until encrypted_x != previous encrypted_x
        until encrypted_x != x or no other x available
        buf[x] = encrypted_x
        done
```

Each entry in the encryption table generated by the shuffle function is checked for uniqueness against prior existing values in the encryption table. If a newly generated value is not unique, another iteration of the shuffle function is performed to generate a new entry. Consequently, the encryption table will yield a set of 256 values that are unique and substantially random, though arithmetically related to the password key. Other specific methods of generating the encryption table may be readily utilized so long as the foregoing two requirements are met.

A decryption table 58 is generated based on the encryption table 56 and stored in the alpha structure 50. Preferably a reverse table generation algorithm is applied to the encryption table to generate the decryption table. That is, the decryption table is generated by storing index values at locations within the decryption table selected by the data value stored within the encryption table at the index offset location. In the preferred embodiment of the present invention the algorithm is implemented as shown in Table VI.

TABLE VI

Pseudo Code for the Decryption Table Generation

```
for (i=0; i < 256; i++) {
        decryptab[ encryptab[i] ] = i ;
}
```

However, any relationship between the encryption and decryption tables may be used so long as there is an arithmetic identity in the transformation of a data value applied to the encryption table and the resultant value when applied to the decryption table.

Finally, the password key is encrypted using the encryption table 56 through a process of index substitution. That is, bytes from the encryption table are selected using respective bytes of the key as indices into the encryption table.

Alpha structures, in accordance with the present invention, may both pre-exist when an alpha structure 50 is needed for a new process and may be shared. As before, alpha structures 50 are permanently allocated and maintained in a pool structure within the kernel data space. When a new alpha structure 50 is needed, the alpha structures in the pool are first examined to determine if one has already been initialized with the same password key. That is, a comparison is performed between the entered password key, once encrypted and the encrypted password keys stored by the alpha structures in the pool. If a match is found, then the reference count of the structure is incremented and the structure is assigned to the alpha table slot. If no match is found, then any available alpha structure 50 (reference count zero) from the pool is initialized, as discussed above, for the entered password key. The resultant structure 50 is then assigned to the primary and working key entries of the alpha table slot or, if another alpha structure has already been assigned to the primary key entry, then to the alternate and working key entries. If there is no available alpha structure 50 in the pool, then a new structure is dynamically allocated and placed in the pool.

Figure 4B:
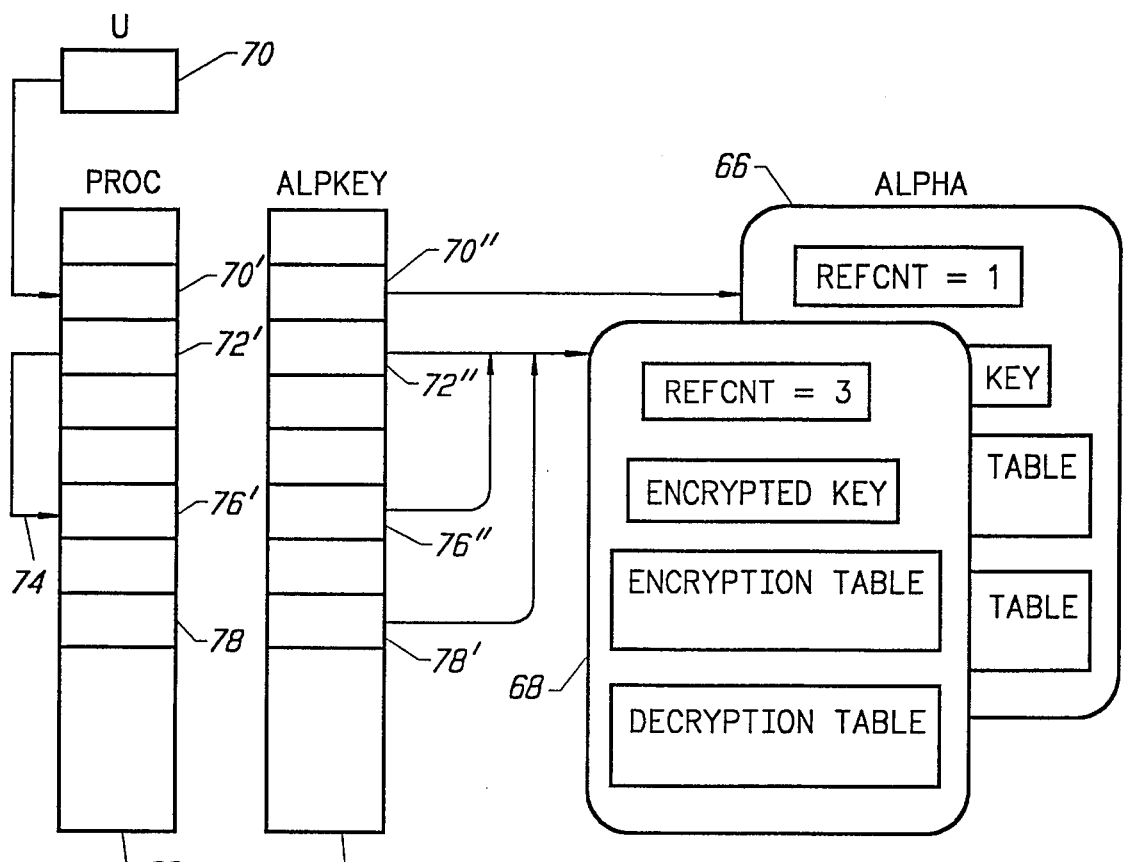
FIG. 4b is a representative depiction of the relation between a user procedure control table, kernel process control table and encryption control table in accordance with a preferred embodiment of the present invention.

The relationship between process table 62, alpha table 64 and multiple references to alpha structures 66,68 is shown diagrammatically in FIG. 4b. By reference to the process 70 in which the get_key application program is executed, the index offset of the process slot 70' in the process table 62 may be known. The same offset value is used to reference a slot 70" within the alpha table 64. An entry within the slot 70" then references an alpha structure 66.

Where a new process slot 76' is initialized as a result of a fork system call, as indicated by the arrow 74, corresponding slot 76" is initialized in the alpha table. The alpha structure pointer entries in the slot 76" duplicate the entries in the slot 72". The reference counts of the resulting shared alpha structures 68 are incremented. This sharing of structures 68 results in an effective inheritance of the password keys corresponding to the slot 72".

The sharing of alpha structures will also occur when the same password key is entered in independent processes. The alpha structure pool is scanned in initialization of a slot 78". If a matching encrypted password key is found, in structure 68 as shown, then the reference count of the structure 68 is incremented and a pointer to the structure 68 is assigned to an entry in the slot 78". Distinct from the case of inheritance of structures, this sharing of alpha structures is limited to the specific structure that is matched, and not all of the structures associated with another process slot.

Figure 4C:
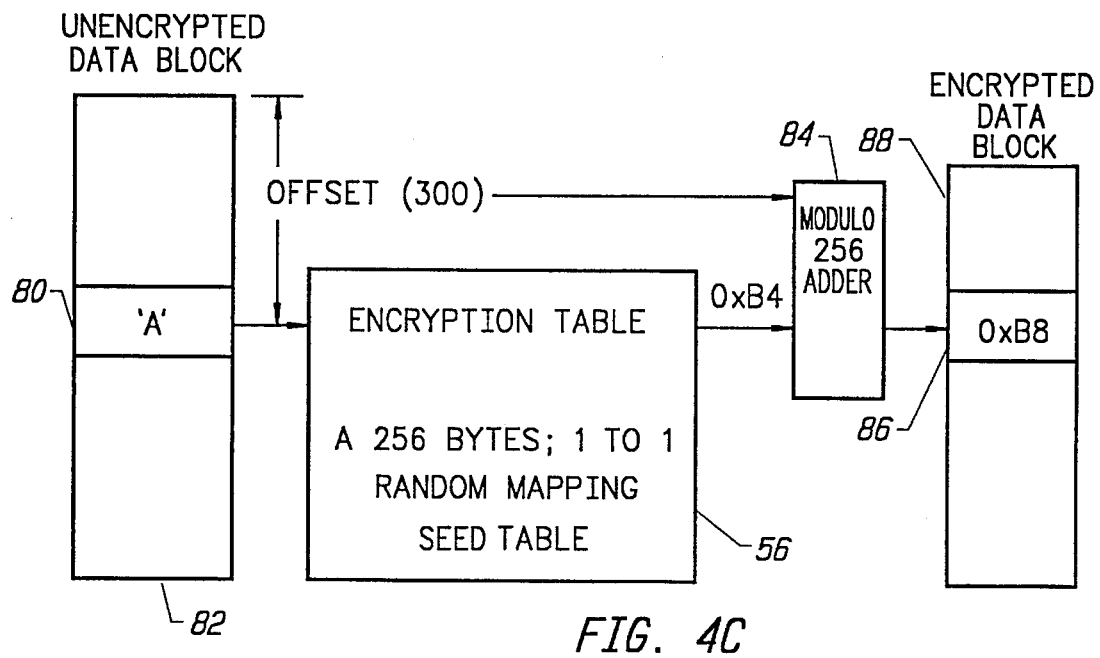
FIG. 4c is a representative depiction of the encryption process in accordance with a preferred embodiment of the present invention.

Referring now to FIG. 4c, the process of encrypting data will be described. In accordance with the preferred embodiment of the present invention, data is encrypted in individual blocks corresponding to the smallest buffered block size supported by the operating system. In the preferred embodiment, as is typical of standard Unix operating system variants, the minimum buffered block size is 256 bytes. Consequently, as shown in FIG. 4c, even an individual data value (byte) 80 being written ultimately out via a buffered write system call procedure will implicitly have an offset corresponding to the beginning of a data block 82. The actual data value being written is utilized, in the preferred embodiment of the present invention, as an index value against the encryption table 56 stored as part of the alpha structure 50. The resultant value and the block offset of the data being written are combined by a modulo 256 adder 84. The resultant byte value 86 is stored in the same block offset location in an encrypted data block 88. In accordance with the preferred embodiment of the present invention the unencrypted and encrypted blocks 82 and 88 are one and the same.

Figure 4D:
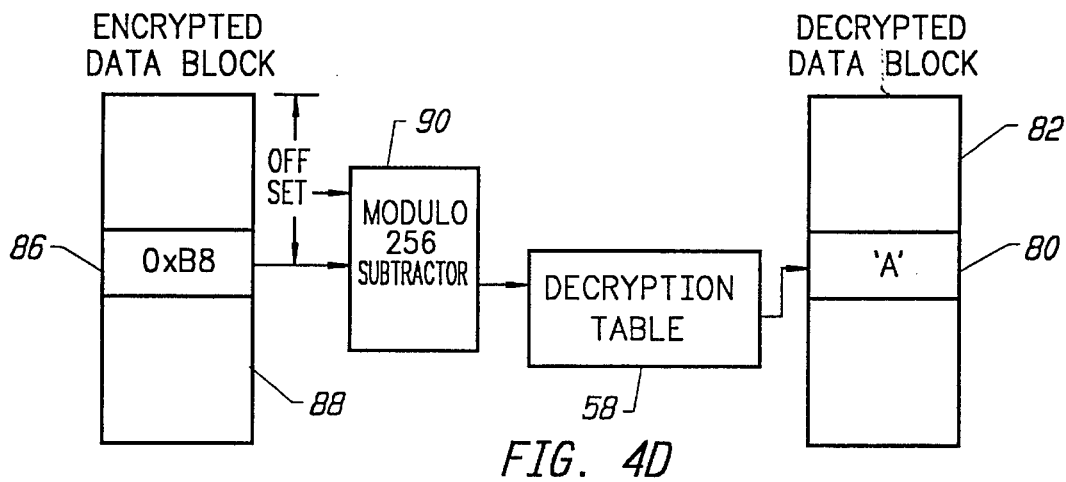
FIG. 4d is a representative depiction of the decryption process in accordance with a preferred embodiment of the present invention.

The reverse procedure for converting an encrypted data block 88 to an unencrypted data block 82 is shown in FIG. 4d. An encrypted data value 86 is combined with the corresponding block offset value by a modulo 256 subtractor 90 and the resultant value is utilized as an index into the alpha structure decryption table 58. The value thus identified in the decryption table is the unencrypted original data value 80. This data value may then be stored in the buffered block offset location 80 from whence the encrypted data byte was obtained.

Consequently, buffered random reads and writes of an encrypted data file at a block level are permitted by operation of the present invention. The entire data file need not even be read into memory or otherwise copied for decryption. Rather, only the specific block containing the file portion requested by an application program, unaware and uninformed of the operation of the present invention, need be decrypted for use by the application program and subsequently re-encrypted in writing back the data. Only the minimum portion of a file required by the application program is at any one time decrypted within the entire memory space of the computer system 10. Furthermore, data pending either a read or write operation to disk 22 or other storage medium persists only in an encrypted state. All data subject to encryption by operation of the present invention is maintained in an encrypted state in the buffer pool.

Figure 5A:
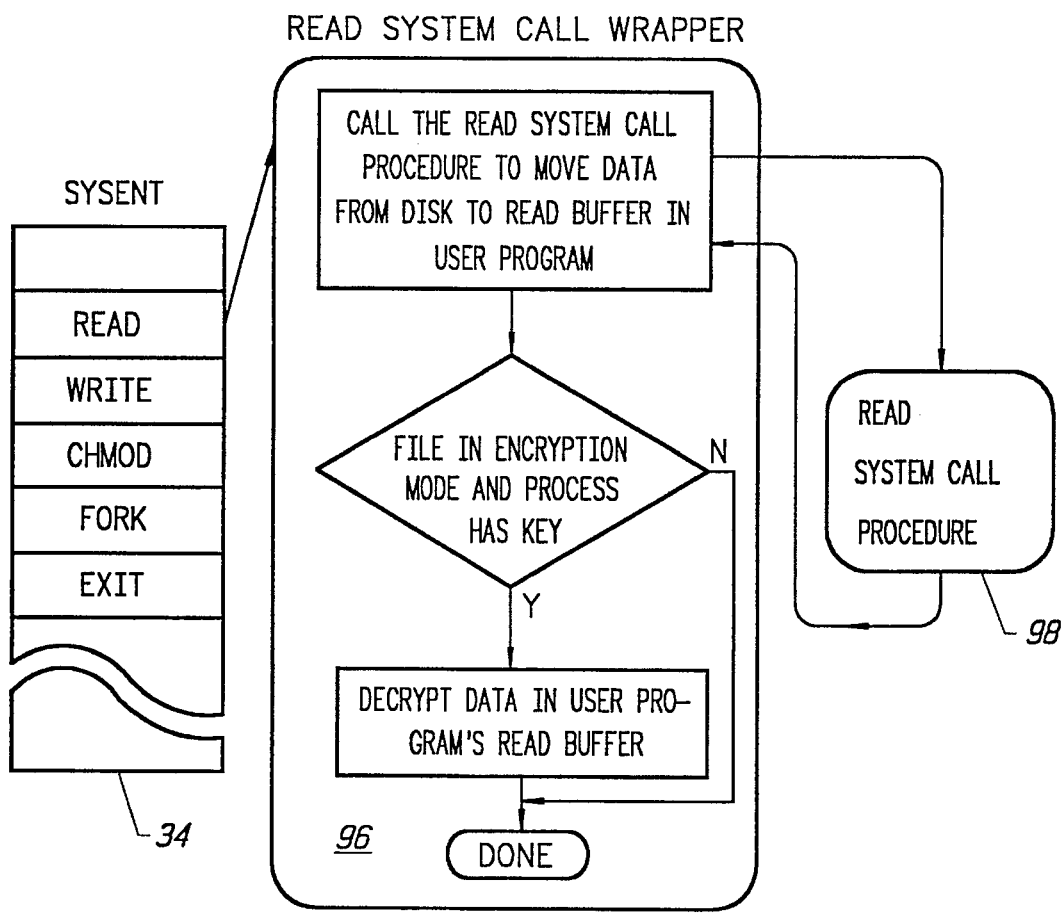
FIG. 5a is a schematic diagram illustrating the control flow in support of a modified read operation in accordance with a preferred embodiment of the present invention.

FIG. 5a provides a schematic diagram of the control flow involved in execution of a modified read system call procedure. The read system call wrapper procedure 96 is called from the read entry of the sysent table 34. If the encryption facility of the present invention is enabled and an alpha structure is referenced by the working key entry, the read referenced file is checked for an in-core inode corresponding enode table structure. The enode structure is provided in Table VII.

TABLE VII

Structure of the "enode" Table

| struct enode { | | /* the enode */ |
|---|---|---|
| unsigned | magic1; | /* delimiter fixed value */ |
| char | magic_text; | /* encrypted text */ |
| struct key | shadow_key; | /* writing key */ |
| short | flags; | /* transform type & status */ |
| unsigned | magic2; | /* delimiter fixed value */ |
| } | | |
| struct inCoreEnode { | | /* the in-core enode */ |
| char | inUse; | |
| struct enode | enode; | |
| } | | |
| struct enode_t { | | /* the enode table */ |
| ... | | |
| struct inCoreEnode | *inCoreE; | |
| } | | |

The enode table is populated with enode structures corresponding to all opened files. That is, an enode structure is effectively allocated each time a file is opened or created so as to parallel the existence of corresponding in-core inode structures. When a file is opened, any existing enode structure appended to the file is read into the corresponding enode table structure. Otherwise, the enode table structure is left in a null pointer default state.

As with the alpha table relationship to the process table, the enode table can be inferentially referenced by an offset value determinable from a reference to the in-core inode table. From the in-core inode identification of a file to be read, thus presuming the existence of both an open in-core inode and a corresponding enode structure, the contents of the identified enode structure can be used to authenticate the encrypted data against the specific encrypted password key held by the read requesting process.

Authentication requires first that an enode structure validly existed at the end of the file when the file was opened. Second, one of the encrypted keys associated with the current process must be capable of validly decrypting the code in the magic_text character space of the enode structure. That is, the magic_text must decrypt into a known data string. If a correct decryption of the magic_text is performed using the user's primary key, then the encrypted data can be accessed directly. If the user's alternate key is found to properly decrypt the magic_text, the encrypted key stored in the enode structure is obtained and a working key alpha structure is created distinct from the alpha structures identified by the primary and alternate key entries. Thus, transparently to the user, access to the contents of an encrypted file created with a different password key than held by the current user is securely obtained.

The read system call procedure 98, is then called to obtain the requested block of data. In the preferred embodiment, this call is preferably integrated at the Unix "readi" file system switch call level, which is one layer below the system call interface layer, to permit file system switch independent operation. The read system call procedure returns the requested data to a buffer typically located in the user data space pre-allocated by the requesting application program. However, the read system call wrapper procedure 96 may access this buffer location while continuing to execute in kernel mode. That is, conventional kernel subroutine calls permit the read system call wrapper procedure to obtain the location of the user space buffer filled as a consequence of the read system call procedure. If the file was authenticated as an encrypted file capable of decryption, the read system call wrapper procedure 96 decrypts the data in the user space read buffer. The decryption of the buffer data is performed by reading bytes of data from the user space read buffer, decrypting the byte of data in accordance with the process described in connection with FIG. 4d, and then writing out the resultant byte of data to the user space read buffer. Once the entire buffer of data has been decrypted, the read system call wrapper procedure returns, permitting a switch out of kernel mode as appropriate to enable the application program to execute and process the unencrypted data present in the user space read buffer.

If, however, the current process has entered no password key, or the password key entered is not authenticated, then the decryption of data in the user space read buffer is not performed. Therefore, the user application program only receives encrypted data in accordance with the intended operation of the present invention.

Conversely, regardless of the password key entered for a present process, if the file does not have a corresponding enode structure (inCoreEnode is null or not in use) or the data is not from a regular file, and therefore not subject to encryption, the data provided by the read system call procedure 98 is again left unmodified in the user data space read buffer. This unmodified read data is assumed to be unencrypted data in accordance with the intended mode of operation of the present invention.

In similar fashion, the write system call wrapper procedure is invoked to implement the functions of the present invention in connection with the writing of data to a regular file. Thus, when a user program invokes a write, specifically integrated as a call to the Unix "writei" file system switch call layer, a file enode structure and type are examined to determine whether the referenced file may be encrypted. If encryption is possible, then the enode structure data is authenticated, if possible.

If authentication succeeds, the write data buffer, again existing in the user data space, is located and the contents of the buffer are encrypted. The encryption procedure used is that discussed in connection with FIG. 4a. Once the write buffer has been encrypted, the ordinary write system call procedure is called to write out the contents of the user data space write buffer. If the write of the buffer would alter the proper existence of the appended enode structure, the enode structure is rewritten to the end of the file.

Since the application program still has access to the write data buffer, the user data space data must then be restored to an unencrypted state. Accordingly, the write system call wrapper procedure then decrypts the data in the write buffer utilizing the process described in connection with FIG. 4b. This decryption is performed only if the data was encrypted prior to the execution of the write system call procedure.

If the write data file is not identified as being encrypted by the enode structure data or if the file is not a regular file, thereby precluding encryption, the write system call wrapper procedure simply calls the write system call procedure. Unencrypted data is therefore written out to an unencrypted file. The write system call wrapper procedure then returns.

When the fork system call wrapper procedure is called, the fork system call procedure is first executed. As expected, this results in a duplication of the parent process and kernel mode execution continuing separately for both the parent and child processes. Each returns to a respective copy of the fork system call wrapper procedure, if the encryption capability of the present invention is enabled. These two kernel mode processes, due to their initial identity, must then test for parent or child status. In the preferred embodiment of the present invention this can be accomplished by each determining if the process has an existing alpha structure assigned. The parent process is the only one of the two processes that may have an allocated alpha structure associated with the process. Therefore, if one or more valid alpha structure entries exist, as may be determined from a non-zero reference count, the corresponding process must be the parent process. The parent process need do nothing and preferably then returns from the fork system call wrapper procedure. Conversely, the child process will copy the entries of the parent alpha table slot to the alpha table slot corresponding to the child process. The child process then increments the reference count in each of the newly referenced alpha structures and, finally, returns from the fork system call wrapper procedure.

The exit system call wrapper procedure, when called, determines whether one or more alpha structures are referenced by the alpha table slot of this process. If any referenced structures exist, the reference count of each structure is decremented. The corresponding pointer entry in the alpha table is then set to null. The exit system call procedure is then called. As expected, this system call procedure results in the calling process being terminated in both user and kernel mode and the corresponding slots in the process table being marked as unused. Generally, the return from the exit system call procedure is internal to the kernel.

Figure 5B:
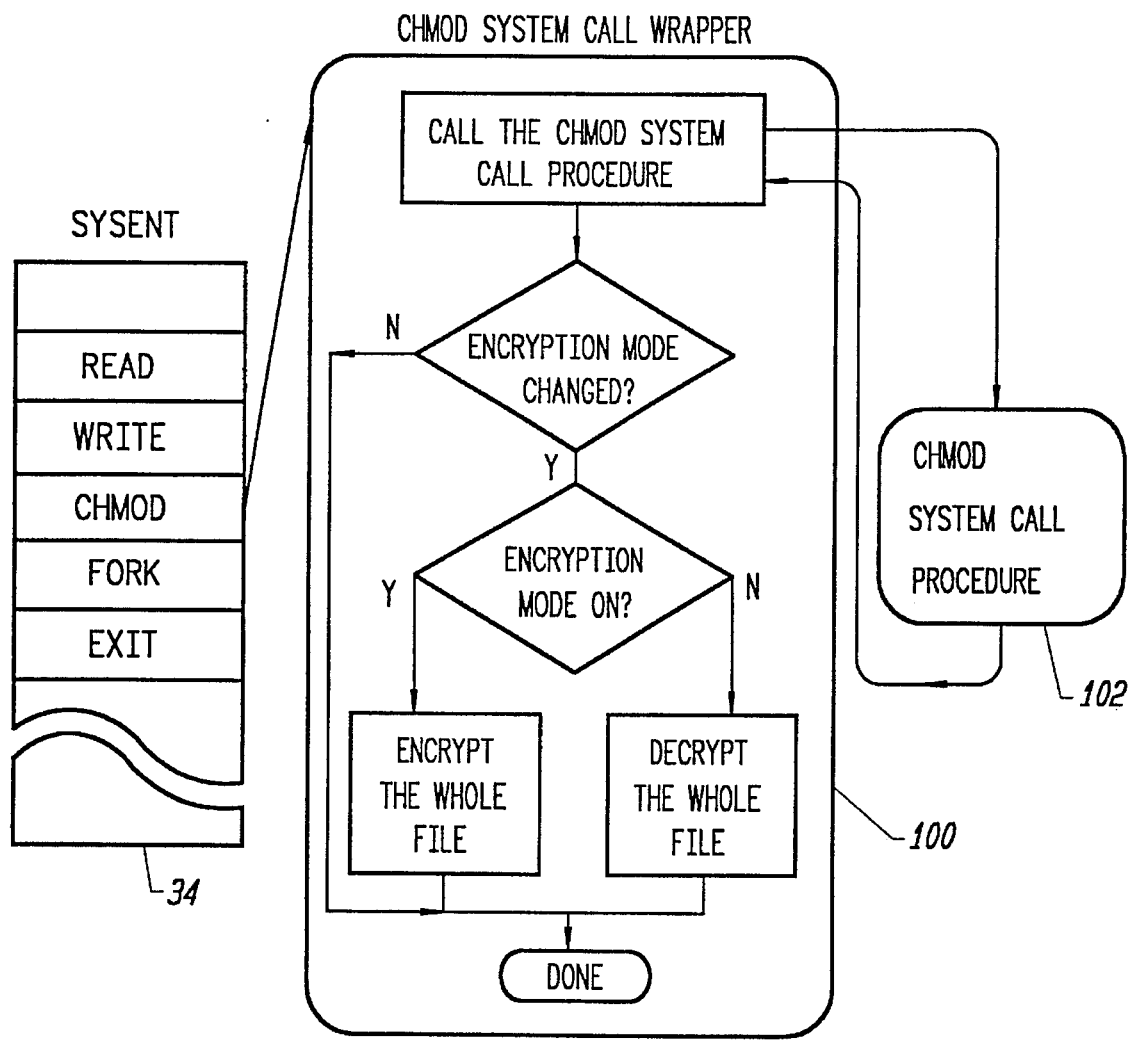
FIG. 5b is a schematic diagram illustrating the control flow in support of a modified chmod operation in accordance with a preferred embodiment of the present invention.

FIG. 5b provides a schematic diagram illustrating the control flow resulting from a chmod system call as modified in accordance with an alternate embodiment of the present invention; specifically, an embodiment that utilizes the mode bits to signify a transform state of a file. When the chmod system call wrapper procedure 100 is called, the disk inode is obtained for the file which is the target of the chmod call. The existing mode of the file is stored for later reference. A determination is then made as to whether the encryption signifying bits of the mode are being changed and, if so, whether the file is a regular file and the process user identification (ID) and inode user ID match. If these encryption conditions are met, the encryption state of the file may be permitted to change. Otherwise, the requested change to the mode is modified to exclude a change of the encryption bit state.

The chmod system call procedure 102 is then called. Upon return, the chmod system call wrapper procedure 100 will also simply return either if no change in the encryption state was detected or if the prerequisites for encryption of the file were not met.

However, if a change to the encryption state of the file is proper, a determination is made as to whether the file is to be encrypted or decrypted. If a group mode bit was on originally and now all have been set to off, meaning to encrypt, the data blocks of the file are successively read in to a kernel space buffer, encrypted per the process of FIG. 4c, and then written back out to the file. A copy of the enode structure is then appended to the file using the current working key as the basis for the encryption of the source text stored as the magic_text field of the enode structure.

If the file was identified as encrypted originally and a group mode bit has been set on, then each block of file data is read into a kernel buffer, decrypted in accordance with the process of FIG. 4d, and then written back out to the file. The enode structure is stripped and discarded. In either case, once the file has been converted in its entirety consistent with the new state of the group encryption mode, the chmod system call wrapper procedure returns.

The preferred embodiment of the present invention, however, does not rely on the mode bits, but rather on the presence of the enode structure appended to a regular file. A regular file is initially transformed by operation of an application program (set_transform) specific to the present invention. This program, when executed, obtains the name of an explicitly identified file to be transformed. This file name is provided by way of a set_mode ioctl call to the device driver of the present invention. The identified file is then transformed using the encryption process described above in relation to the chmod wrapper procedure, though without the necessity of testing the state of the mode bits. Conversely, an explicitly identified file can be untransformed by making a reset_mode ioctl call with the name of the file. The identified file is then decrypted using the decryption process described above in relation to the chmod wrapper procedure, though again without the necessity of testing the state of the mode bits.

Finally, a number of related system call wrapper procedures are provided to further support the transparency of the encryption mechanism. The open and create system call procedures must be intercepted by wrapper procedures to prevent the truncation of the referenced file, in addition to the allocation of enode structures. A parameter to the open system call procedure can specify that the file is to be opened and immediately truncated to a zero file length. The open system call wrapper procedure, however, Upon determining that the referenced file is encrypted and the open call requests truncation, requires authentication of the password keys held by the calling process. Likewise, the create system call wrapper procedure, on determining that the referenced file preexists and is encrypted, first requires authentication before the create system call procedure is called. A failure of authentication in either case returns an access error to the calling procedure.

Seek and status (statf) system call wrapper procedures are provided to effectively hide the existence of the enode structure data. Where a referenced file is determined to be encrypted and authentication of a password key of the calling procedure succeeds, the seek system call procedure will artificially reduce the size of the referenced file by the size of the enode structure. This allows seek operations relative to the end of file or that extend beyond the end of file to be properly handled. Similarly, the file size returned by the status system call procedure is artificially reduced by the size of the enode structure.

As can be seen from the foregoing, a flexible filesystem extension mechanism, particularly capable of implementing a transparent transform capability including a highly secure file encryption system, has been described broadly in connection with inter-networked and multi-tasking operating systems and specifically in regard to a Unix operating system.

Based on the foregoing discussion of the preferred embodiments of the present invention, persons of ordinary skill in the art will readily appreciate that further modifications, adaptations and extensions can be applied to the invention disclosed herein. Accordingly, the present invention may be practiced, within the scope of the appended claims, other than as specifically described above.

I claim:

1. A computer system including a file transform mechanism, said system comprising:
   a) a file storage subsystem that provides for the storage of a file composed of one or more blocks of data;
   b) a memory providing for the storage of blocks of data in first and second logical data areas within said memory;
   c) a processor, including programming, providing for the execution of instructions implementing a computer operating system in said first logical data area and an application program in said second logical data area, said processor being coupled to said file storage subsystem and said memory to permit the transfer of a predetermined block of data between said file storage subsystem and said memory, said processor including
      i) a transform function, defined by the execution of instructions of said computer operating system, for translating said predetermined block of data between first and second data representations in said first logical data area separately from another block of data;
      ii) a request function, defined by the execution of instructions of said application program, for selecting said predetermined block of data to be operated on by the execution of instructions of said application program in said second logical data area; and
      iii) an interface function, defined by the execution of instructions of said computer operating system and coupled to said transform function and said request function, that controls the transfer of said predetermined block of data between said file storage subsystem and said memory and between said first and second logical data areas of said memory, said interface function determining whether said predetermined block of data is in said first or second data representations and wherein said interface function, responsive to said request function, controls the transfer of said predetermined block of data from said file storage subsystem to said memory and from said first logical data area to said second logical data area selectively through said transform function.

2. The computer system of claim 1 wherein said file storage subsystem further stores authentication data with respect to said file, said authentication data relating said first and second transform representations of said data blocks of said file.

3. The computer system of claim 2 wherein said authentication data is accessible by said interface function and used in determining whether said predetermined block of data is in said first or second data representation.

4. The computer system of claim 1, 2, or 3 wherein execution of said transform function provides for the performance of at least one transform from a set of transforms including encryption, compression, encoding, translation and conversion.

5. A computer system including a file encryption mechanism, said system comprising:
   a) a file store providing for the storage of a file including one or more blocks of data;
   b) a memory store providing for the storage of blocks of data in first and second logical data areas; and
   c) a processor coupled to said memory store and said file store for executing instructions implementing a computer operating system as stored in said first logical data area and an application program as stored in said second logical data area, said processor providing for the controlled transfer of a predetermined block of data between said file store and said data store means, said processor including:
      i) an encryption routine, defined by the execution of instructions of said computer operating system, for encrypting and decrypting said predetermined block of data in said first logical data area separately from another block of data;
      ii) a request routine, defined by the execution of instructions of said application program, for selecting said predetermined block of data to be operated on by the execution of instructions of said application program in said second logical data area; and
      iii) a system interface routine, defined by the execution of instructions of said computer operating system and responsive to said request routine, that controls the transfer of said predetermined block of data between said file store and said data store and between said first and second logical data areas of said data store, said system interface routine determining whether said predetermined block of data is encrypted as stored by said file store, said system interface routine selectively directing the transfer of said predetermined block of data between said first and second logical data areas through said encryption routine.

6. The computer system of claim 5 wherein said file store further stores file attribute data defining predetermined attributes of a corresponding file stored by said file store, said file attribute data including a file encryption attribute.

7. The computer system of claim 6 wherein said file attribute data is accessible by said system interface routine and wherein said file encryption attribute is used to determine whether said predetermined block of data is encrypted.

8. A mechanism providing for transparent key based file protection in a computer system including a processor, main memory and a mass storage device, wherein the processor executes an operating system stored within the main memory, wherein execution of the operating system establishes kernel and application data spaces within the computer system, and wherein the operating system includes a system call interface supporting a plurality of operating system calls and a memory access routine executable by the processor providing for the transfer of a block of data between the kernel and application data spaces within the main memory and between the main memory and a mass storage device that provides for the storage of a file including one or more blocks of data, said mechanism comprising:
   a) a key dependant data transformation routine provided in said kernel data space, executable by the processor and coupleable to the memory access routine, for selectively transforming a predetermined block of data of a predetermined file between first and second data representations based on a transformation key that is arbitrarily related to the data of said predetermined block of data; and
   b) an interface routine interposed between the system call interface and the memory access routine within said kernel data space, said interface routine being coupled to the memory access routine to control the transfer of said predetermined block of data between the kernel and application data spaces, said interface routine determining whether said predetermined block of data is in said first or second data representation when stored in said predetermined file, said interface routine selectively providing for the transfer of said predetermined block of data between through said key dependant data transformation routine whereby said predetermined block of data is transformed between said first and second data representations transparently with respect to an application executable in said application data space.

9. The mechanism of claim 8 wherein the memory access routine includes a plurality of memory access subroutines that provide for reading said predetermined block of data from said predetermined file, writing said predetermined block of data to said predetermined file, and establishing file characterization attributes associated with said predetermined file, wherein said interface routine includes a plurality of transformation control subroutines that are associated respectively with said plurality of memory access subroutines, and wherein each of said transformation control subroutines may determine whether said predetermined block of data is in said first or second data representation by examination of said file characterization attributes associated with said predetermined file.

10. The mechanism of claim 9 wherein the file characterization attributes associated with said predetermined file includes predetermined key validation data, wherein a predetermined password is associated with a predetermined application program executable in said application data space, said interface routine including a data representation transformation table established with respect to said predetermined application program for use by said key dependant data transformation routine, wherein the contents of said data representation transformation table is data dependant on said predetermined password.

11. The mechanism of claim 10 wherein the operating system provides for application programs to be executed within processes and wherein the operating system includes a fork routine for instantiating a predetermined child process related to a predetermined parent process within which said predetermined application program is executed, said interface routine including a fork subroutine that is associated with said fork routine, and wherein said fork subroutine associates said data representation transformation table with said predetermined child process, whereby said predetermined child process transparently inherits said predetermined password in connection with the instantiation of said predetermined child process.

12. The mechanism of claim 8, 9, 10, or 11 wherein said key dependant data transformation routine performs at least one transform from a set of transforms including encryption, compression, encoding, translation and conversion.

13. A key-based transparent file encryption system for use in a computer system employing a processor for executing programs, a file system providing for the storage of program and data files, a memory coupled to the processor and providing for the storage of programs and data, and an operating system including a program interface for receiving a plurality of system call types and a plurality of system call subroutines that implement the file oriented system calls, said key-based transparent file encryption system comprising:

a) an encryption routine implementing a key based encryption algorithm that, upon execution by the processor, provides for the encryption and decryption of a predetermined file dependant on the value of a predetermined encryption key; and b) an interface module including a plurality of system call subroutine wrappers interposed between the execution control path between the program interface and the plurality of system call subroutines, said interface module providing for the transfer of said predetermined file selectively subject to the function of said encryption routine, said interface module determining from predetermined attribute data provided with said predetermined file whether said predetermined file will be in an encrypted state as stored by the file system, said interface routine further operating to authenticate a predetermined password against the attribute data provided with said predetermined file where said predetermined password is associated with a predetermined application program that provides a data transfer system call to the program interface with respect to said predetermined file, said interface module selecting said encryption routine to encrypt or decrypt said predetermined file as transferred between said predetermined application program and the file system where said predetermined password is authenticated and where said predetermined file is in an encrypted state as stored by the file system.

14. The key-based transparent file encryption system of claim 13 wherein the encryption and decryption of said predetermined file by said encryption routine is dependant on said predetermined password as an encryption key.

15. The key-based transparent file encryption system of claim 14 wherein said predetermined application executes within a predetermined process of a plurality of processes executed by the processor under the control of the operating system, wherein said predetermined process and a forked process related as a child to said predetermined process is associated with a predetermined data structure established in said interface module in connection with the authentication of said predetermined password, and wherein said predetermined data structure includes an encryption table generated by said interface module based on said encryption key, said interface module providing for the inheritance of an association with said predetermined data structure by said forked process, whereby selective transformations of file data between encrypted and decrypted states are transparent to said predetermined application and any application executed in said forked process.

16. The key-based transparent file encryption system of claim 13, 14 or 15 wherein respective instances of said predetermined attribute data are attached to the files as stored by the file system that have been encrypted by said interface module, and wherein said predetermined attribute data includes an encrypted copy of a predetermined data string that is used in authenticating said predetermined password and predetermined flag data defining the encryption state of the attached file.

* * * * *